(12) United States Patent
Kim

(10) Patent No.: US 7,453,776 B2
(45) Date of Patent: Nov. 18, 2008

(54) OPTICAL DISC RECORDING/REPRODUCING APPARATUS AND A METHOD FOR DETERMINING WRITE STRATEGY THEREOF

(75) Inventor: Min-seok Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 651 days.

(21) Appl. No.: 11/191,022

(22) Filed: Jul. 28, 2005

(65) Prior Publication Data

US 2006/0077848 A1 Apr. 13, 2006

(30) Foreign Application Priority Data

Sep. 24, 2004 (KR) ............... 10-2004-0076790

(51) Int. Cl.
*G11B 7/00* (2006.01)

(52) U.S. Cl. ............... 369/47.51; 369/116; 369/59.11; 369/53.26

(58) Field of Classification Search ..... 369/47.5–47.53, 369/53.26, 59.11, 116
See application file for complete search history.

(56) References Cited

U.S. PATENT DOCUMENTS

| | | | | |
|---|---|---|---|---|
| 5,475,666 A | * | 12/1995 | Ito et al. | 369/47.52 |
| 5,726,954 A | * | 3/1998 | Matsumoto et al. | 369/116 |
| 6,304,533 B2 | * | 10/2001 | Toda et al. | 369/47.51 |
| 7,151,728 B2 | * | 12/2006 | Shoji et al. | 369/47.53 |
| 7,193,950 B2 | * | 3/2007 | Nakamura | 369/59.11 |
| 7,227,818 B1 | * | 6/2007 | Toda et al. | 369/47.53 |
| 7,254,101 B2 | * | 8/2007 | Kato et al. | 369/47.53 |
| 2004/0017750 A1 | * | 1/2004 | Hsu et al. | 369/47.53 |

FOREIGN PATENT DOCUMENTS

| | | |
|---|---|---|
| JP | 2002-288827 | 10/2002 |
| JP | 2003-036650 | 2/2003 |
| KR | 2001-0056435 | 7/2001 |

* cited by examiner

*Primary Examiner*—Thang V Tran
(74) *Attorney, Agent, or Firm*—Staas & Halsey LLP

(57) ABSTRACT

An optical recording and reproducing apparatus and a method for determining a write strategy thereof, includes a pickup part to record record data by irradiating a light on an optical disc, a driving part to operate the pickup part to irradiate the light corresponding to a predetermined optical parameter, an optical parameter variation part to vary the parameter within a predetermined variation range by a certain unit and to output the parameter to the driving part, a parameter determination factor measurement part to measure a parameter determination factor based on signals output from the pickup part, and a control part to determine a middle point between a maximum point and a minimum point of the optical parameter, within a range where the measured parameter determination factor does not exceed a reference value, as a final parameter. Accordingly, an optimal write strategy, in which the optical determination factor does not exceed the reference value, may be determined.

14 Claims, 3 Drawing Sheets

OPTICAL DISC RECORDING/REPRODUCING APPARATUS AND A METHOD FOR DETERMINING WRITE STRATEGY THEREOF

CROSS-REFERENCE TO RELATED APPLICATIONS

This application claims the benefit of Korean Patent Application No. 2004-76790, filed Sep. 24, 2004, in the Korean Intellectual Property Office, the disclosure of which is incorporated herein by reference.

BACKGROUND OF THE INVENTION

1. Field of the Invention

The present invention relates to an optical recording and reproducing apparatus and a method for determining a write strategy thereof. More particularly, the present invention relates to an optical recording and reproducing apparatus which determines information on a write strategy appropriate for characteristics of an optical disc in order for optimal recording of data on the optical disc.

2. Description of the Related Art

Optical recording media such as an optical disc may be classified into a read-only type such as a compact disc-read only memory (CD-ROM) and a digital versatile disc-ROM (DVD-ROM), a write-once type such as a CD-recordable (CD-R) and a DVD-R, and a rewritable type such as a CD-rewritable (CD-RW) and a DVD-RW.

As the optical recording and reproducing apparatus that records and reproduces data with respect to the optical disc are widely spread, the rewritable-type optical disc capable of recording data thereon at least once is increasing in use.

The optical recording and reproducing apparatus records data on the optical disc using an optical pick-up having a laser diode (LD) or reads from the optical disc and reproduces the recorded data.

The optical recording and reproducing apparatus irradiates a light by a proper optical parameter in order to record the data onto the optical disc, and therefore changes physical properties of data recording layers in the optical disc.

Properties like manufacturing processes and components of the optical discs, even in the optical discs of the same type, can be different according to manufacturers. Therefore, in order to record data in an optimal state, the optical parameter determining a degree of the light irradiation needs to be properly controlled according to the type of the optical discs.

Accordingly, a method has been suggested in a conventional optical recording and reproducing apparatus. In the method, data is recorded on an optical disc by varying a parameter within a certain range, degrees of factors generated in the recorded data and deteriorating recording quality are measured, and the parameter causing the least degree of the factors is selected as a final optical parameter.

However according to the above method, the optical parameter having just the least degree of the factors deteriorating the recording quality is always applied although the quality-deteriorating factors may exceed a reference value. If the optical parameter is used to record the data onto the optical disc, even when the quality-deteriorating factors are over the reference value at the optical parameter, an image may be reproduced in a mosaic form or not reproduced at all.

SUMMARY OF THE INVENTION

An aspect of the present invention is to solve at least the above problems and/or disadvantages and to provide at least the advantages described below. Accordingly, an aspect of the present invention is to provide an optical recording and reproducing apparatus to enable optimal recording by determining a parameter using a maximum and a minimum within a range in which a degree of factors to determine the parameter does not exceed a reference value, and a method to determine a write strategy thereof.

Additional aspects and/or advantages of the invention will be set forth in part in the description which follows and, in part, will be apparent from the description, or may be learned by practice of the invention.

The foregoing and/or other aspects of the present invention are also achieved by providing an optical recording and reproducing apparatus including a pickup part to record record data by irradiating a light on an optical disc, a driving part to operate the pickup part to irradiate the light corresponding to a predetermined optical parameter and an optical parameter variation part to vary the parameter within a predetermined variation range by a certain unit and to output the parameter to the driving part. The optical recording and reproducing apparatus also includes a parameter determination factor measurement part to measure a parameter determination factor based on signals output from the pickup part, and a control part to determine a middle point between a maximum point and a minimum point of the optical parameter, within a range where the measured parameter determination factor does not exceed a reference value, as a final parameter.

According to an aspect of the present invention, the optical parameter includes a bias power and a timing. The bias power includes at least one of a write power, an erase power and a read power. The timing includes a top pulse, a multi pulse and a last pulse.

According to an aspect of the present invention, the parameter determination factor is one of a jitter, a bite error rate, a strength of the bias power, an aspect ratio (AR), a strength of a radio frequency (RF) signal output from the pickup part and a land pre-pit (LPP) detection rate.

According to an aspect of the present invention, the control part controls to expand the variation range of the optical parameter variation part when all of the measured parameter determination factors are below the reference value.

The foregoing and/or other aspects of the present invention are also achieved by providing a method for determining a write strategy for an optical recording and reproducing apparatus, including varying the optical parameter within a predetermined variation range by a certain unit and outputting the varied optical parameter, irradiating a light corresponding to the varying optical parameter to record record data on an optical disc, and generating reproduction data by reproducing the recorded record data. The method also includes comparing the record data with the reproduction data to measure a parameter determination factor, abstracting a maximum point and a minimum point within a range where the measured parameter determination factor does not exceed a reference value, and determining a middle point between the maximum point and the minimum point as a final optical parameter.

According to an aspect of the present invention, the optical parameter includes a bias power and a timing. The bias power includes at least one of a write power, an erase power and a read power. The timing includes a top pulse, a multi pulse and a last pulse.

According to an aspect of the invention, the parameter determination factor is one of a jitter, a bite error rate, a strength of the bias power, an aspect ratio (AR), a strength of a radio frequency (RF) signal output from the pickup part and a land pre-pit (LPP) detection rate.

According to an aspect of the invention, the method includes varying the optical parameter by expanding the variation range when all of the measured parameter determination factors are below the reference value.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
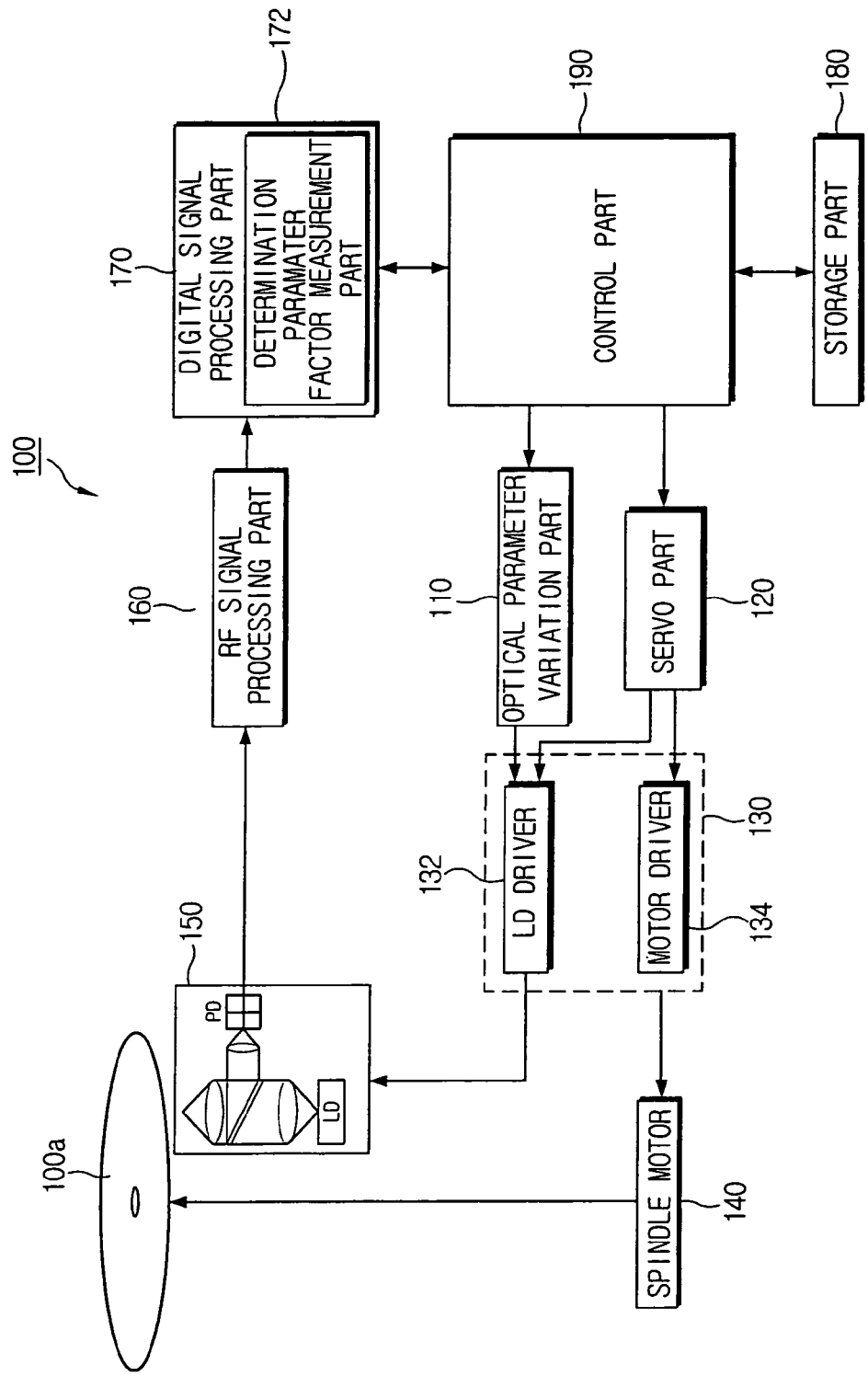
FIG. 1 is a block diagram of an optical recording and reproducing apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

In the following description, same drawing reference numerals are used for the same elements even in different drawings. The matters defined in the description such as a detailed construction and elements are nothing more than the ones provided to assist in a comprehensive understanding of the present invention. Thus, it is apparent that the present invention may be carried out without those defined matters. Also, well-known functions or constructions are not described in detail since they would obscure the invention in unnecessary detail.

An optical parameter required for an optical recording and reproducing apparatus 100 to record and reproduce data includes a bias power and a timing to control irradiation of a light used for data record and reproduction.

The bias power includes at least one of a write power, an erase power and a read power. The timing includes a top pulse, a multi pulse and a last pulse. The bias power and the timing may be classified in greater detail, however, that will not be herein described.

The optical parameters should be determined in consideration of parameter determination factors affecting a recording quality. The parameter determination factors may include one or more of a jitter, a bite error rate, a strength of the bias power, an aspect ratio (AR), a strength of a radio frequency (RF) signal generated during data record, and a land pre-pit (LPP) detection rate.

FIG. 1 is a block diagram of an optical recording and reproducing apparatus, according to an embodiment of the present invention. The optical recording and reproducing apparatus 100 includes an optical parameter variation part 110, a servo part 120, a driving part 130, a spindle motor 140, a pickup part 150, an RF signal processing part 160, a digital signal processing part 170, a storage part 180, and a control part 190.

The optical parameter variation part 110 varies the optical parameter supplied to a laser diode (LD) driving part 132 by a certain unit within a predetermined variation range and outputs the optical parameter in order to determine an optimal optical parameter such as the bias power and the timing.

The servo part 120 controls a focusing servo and a tracking servo according to focusing error signals and tracking error signals output from the RF signal processing part 160 that will be described later. Additionally, the servo part 120 being controlled by the control part 190, controls the driving part 130.

The driving part 130 includes an LD driver 132 to operate the LD and a motor driver 134 to operate the spindle motor 140.

The LD driver 132 drives the LD according to a control of the servo part 120. When recording or reproducing data with respect to an optical disc 100a, the LD driver 132 drives the LD to irradiate a light corresponding to the optical parameter varyingly output from the parameter variation part 110.

The motor driver 134 supplies a driving voltage to rotate and stop the spindle motor 140 depending on a rotation signal or a stop signal output from the servo part 120.

The spindle motor 140 rotates or stops, at a certain speed, the optical disc 100a loaded on the optical recording and reproducing apparatus 100.

The pickup part 150 records record data by irradiating the light onto the optical disc 100a and outputs reproduction data to read and reproduce the data recorded on the optical disc 100a.

To this end, the pickup part 150 includes the LD for to irradiate the light corresponding to the optical parameter onto the optical disc 100a, an object lens to focus the light irradiated from the LD on a surface of the optical disc 100a, a focusing actuator vertically moving the objective lens to focus, a tracking actuator horizontally moving the objective lens to track, and a photo diode to detect the light reflected from a surface of the optical disc 100a.

The RF signal processing part 160 amplifies and waveform-shapes the RF signal output from the pickup part 150 and transmits the RF signal to the digital signal processing part 170. Also, the RF signal processing part 160 detects the focusing error signal and the tracking error signal from the RF signal and applies the detected focusing and tracking error signals to the servo part 120.

When reproducing the data, the digital signal processing part 170 processes the signal output from the RF signal processing part 160 into a digital signal and outputs the digital signal as a reproducible signal. When recording the data, the digital signal processing part 170 processes the record data into a digital signal and outputs the digital signal as a recordable signal.

In the present embodiment, when a reproduction command or a record command is received from the control part 190, the digital signal processing part 170 converts the record data to determine the optimal optical parameter into a test signal recordable on the optical disc 100a.

The digital signal processing part 170 includes a parameter determination factor measuring part 172, which measures the parameter determination factors. The parameter determination factor measuring part 172 measures the parameter determination factors based on the signals output from the RF signal processing part 160 and supplies the measured result to the control part 190. In the present embodiment, a jitter is used as an example of the parameter determination factors.

In order to measure the jitter, the parameter determination factor measuring part 172 may compare the reproduction data, generated by reproducing the record data recorded on the optical disc 100a, with the record data before being recorded.

The storage part 180 generally includes a read only memory (ROM) and a read-only memory (RAM). The ROM stores a control program to control various operations of the optical recording and reproducing apparatus 100 while the RAM temporarily stores assorted data generated while performing the various operations.

The storage part 180 stores a set value of the variation range of the optical parameter, which is varied by the optical parameter variation part 110, and a reference value of the parameter determination factors used to abstract a maximum and a minimum of the optical parameter. Here, the reference value for a jitter rate is approximately 8%.

The control part 190 controls overall operations of the optical recording and reproducing apparatus 100 by the control program stored to the storage part 180. For example, the control part 190 may record the record data on the optical disc 100a loaded on the optical recording and reproducing apparatus 100 or reproduce the data recorded on the optical disc 100a.

The control part 190 abstracts the maximum point and the minimum point of the optical parameter within the range where the parameter determination factors, measured by the parameter determination factor measuring part 172, do not exceed the reference value, and determines the middle point between the maximum point and the minimum point as the final optical parameter.

When all the parameter determination factors measured by the parameter determination factor measuring part 172 are below the reference value, the control part 190 controls the optical parameter variation part 110 to expand the variation range of the optical parameter.

Figure 2:
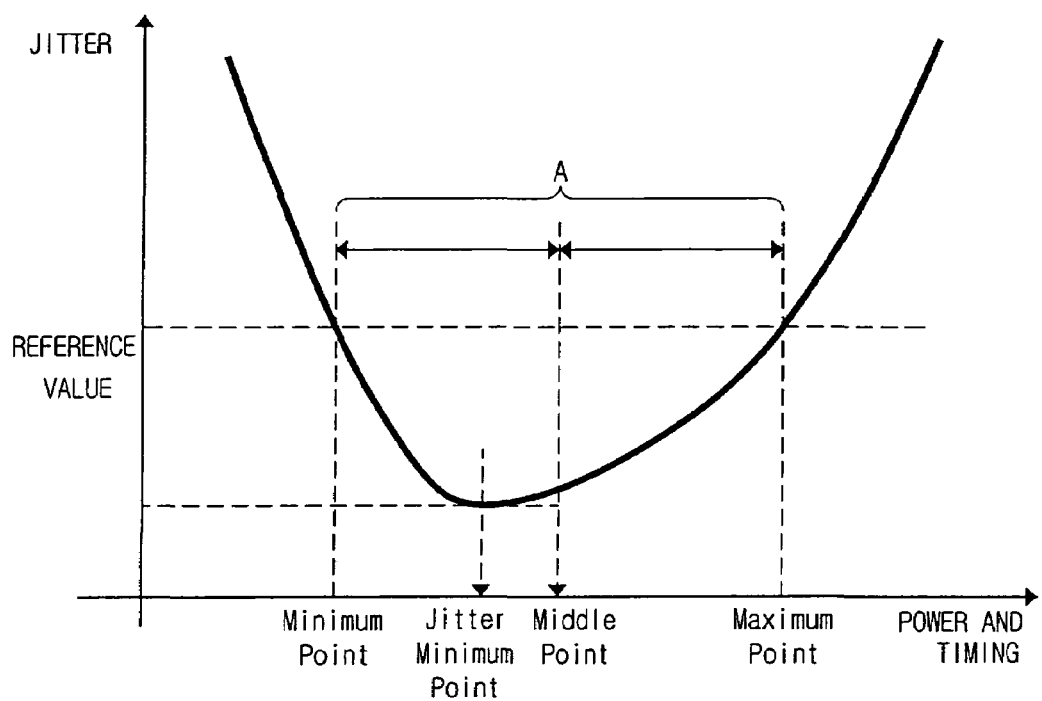
FIG. 2 is a graph illustrating an optical parameter and a value of factors determining the optical parameter.

FIG. 2 is a graph illustrating the optical parameter and the values of the parameter determination factors. When the optical parameter variation part 110 varyingly outputs the optical parameter such as the power and the timing within the variation range, the pickup part 150 irradiates light according to the varied optical parameter, thereby recording the record data onto the optical disc 100a.

The parameter determination factor measuring part 172 measures the jitter, which is one of the parameter determination factors based on the RF signal of the reproduction data output from the pickup 150. The measured jitter may be illustrated by the optical parameter as an unsymmetrical graph shown in FIG. 2.

Referring to FIG. 2, in order to achieve the optimal recording quality, an optical parameter corresponding to a jitter minimum point where a jitter value is the minimum, is applied for the data record. However, the jitter in this case is liable to be over the reference value of 8% and therefore, is not suitable. Therefore, according to an embodiment of the present invention, a maximum point of the optical parameter are abstracted within a range in which the jitter value is not more than the reference value.

Then, a middle point of a range A defined by the maximum point and the minimum point is determined as a final optical parameter and applied for the data record.

As shown in FIG. 2, the jitter minimum point is a bit different from the middle point in the range A determined by the maximum point and the minimum point of the optical parameter; however, such a minor difference does not largely affect a recording function.

Figure 3:
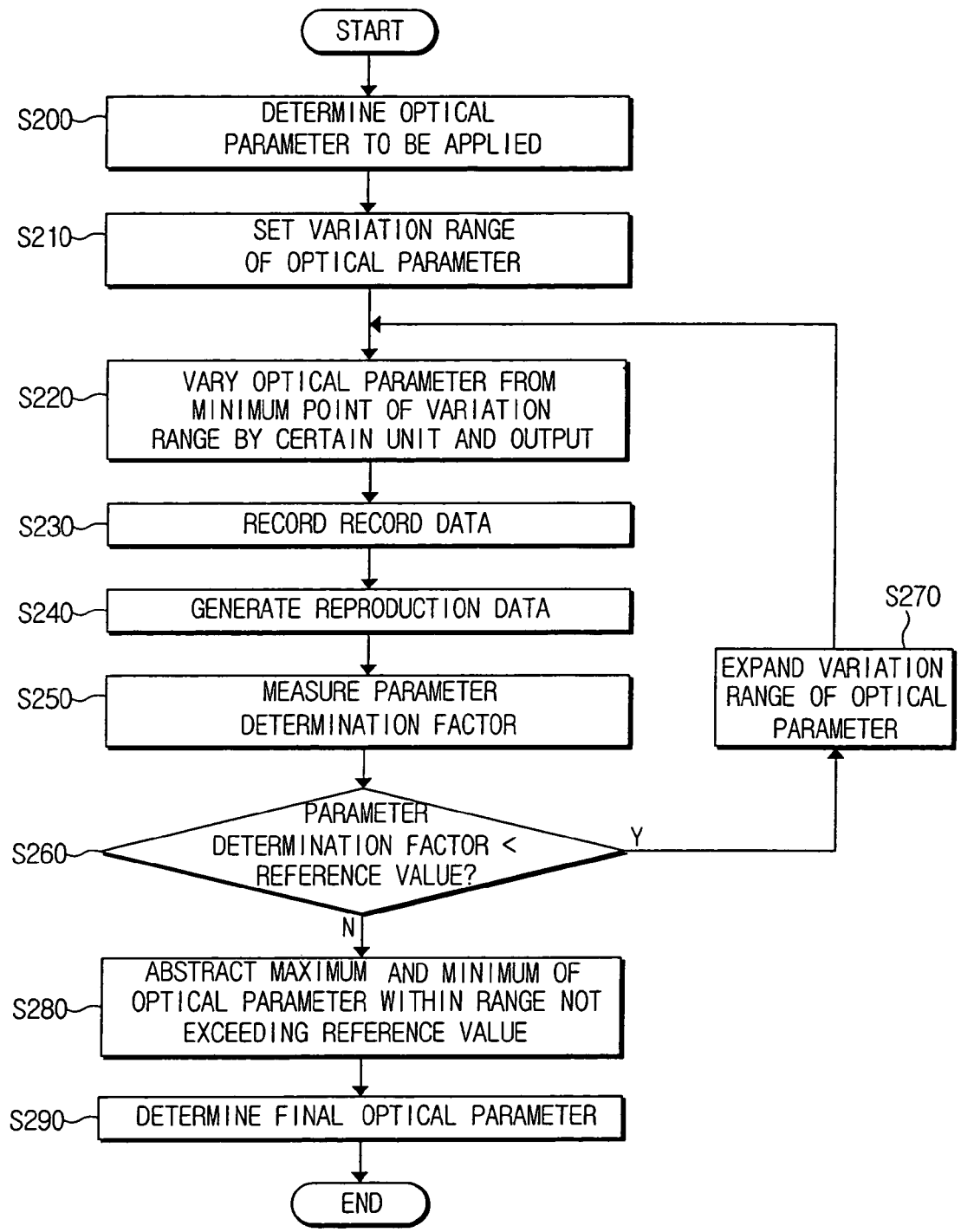
FIG. 3 is a flowchart for explaining a method for determining a write strategy for an optical recording and reproducing apparatus.

FIG. 3 is a flowchart for explaining a method for determining a write strategy of the optical recording and reproducing apparatus.

Hereinbelow, the method for determining the write strategy of the optical recording and reproducing apparatus 100 will be described with reference to FIGS. 1 through 3.

The control part 190 determines the bias power among the write power, the erase power and the read power, and further determines the timing among the top pulse, the multi pulse and the last pulse. The bias power and the timing will be applied for measurement of the jitter (at operation S200). Additionally, the control part 190 sets the variation range for varying therein the determined bias power and the timing by the optical parameter variation part 110 (at operation S210). The variation range stored to the storage part 180 may be applied as is.

The optical parameter variation part 110 varies the bias power and the timing by a certain unit from the minimum point to the maximum point of the variation range and outputs the varied bias power and the timing (at operation S220). The pickup part 150 irradiates a light according to the bias power and the timing varied and output by the optical parameter variation part 110, thereby recording the record data on the optical disc 100a (at operation S230).

When the data record is completed, the pickup part 150 generates the reproduction data by reproducing the record data recorded on the optical disc 110a (at operation S240).

The RF signal of the reproduction data output from the pickup part 150 is amplified and waveform-shaped by the RF signal processing part 160 and applied to the digital signal processing part 170. The parameter determination factor measurement part 172 measures the parameter determination factors based on the signals output from the RF signal processing part 160 (at operation S250).

As the respective values of the parameter determination factors are measured by the parameter determination factor measurement part 172, the control part 190 compares the parameter determination factor with the reference values, respectively (at operation S260).

In operation S260, when all the parameter determination factors are below the reference value, the control part 190 expands the variation range for varying therein the optical parameter by the optical parameter variation part 110 (S270). The optical parameter variation part 110 varies and outputs the optical parameter based on the changed variation range. Accordingly, the parameter determination factors are re-measured (at operations S220 to S250).

In operation S260, when the parameter determination factors are not all below the reference value, the control part 190 abstracts the maximum point and the minimum point of the optical parameter within the range where the parameter determination factors do not exceed the reference value, and determines the range A defined by the maximum point and the minimum point (at operation S280).

The control part 190 determines the optical parameter corresponding to the middle point in the range A (at operation S290).

As described above, the optical recording and reproducing apparatus and the method for determining the write strategy according to an embodiment of the present invention provide an advantage in that the data may be recorded onto the optical disc in the optimal state since the parameter determination factor is always maintained below the reference value.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical recording and reproducing apparatus comprising:
   a pickup part to record record data by irradiating a light on an optical disc;
   a driving part to operate the pickup part to irradiate the light corresponding to a predetermined optical parameter;
   an optical parameter variation part to vary the predetermined optical parameter within a predetermined variation range by a certain unit and to output a varied optical parameter to the driving part;
   a parameter determination factor measurement part to measure a parameter determination factor based on signals output from the pickup part; and
   a control part to determine a middle point between a maximum point and a minimum point of the predetermined optical parameter, within a range where the measured parameter determination factor does not exceed a reference value, as a final parameter.

2. The optical recording and reproducing apparatus of claim 1, wherein the predetermined optical parameter comprises a bias power and a timing.

3. The optical recording and reproducing apparatus of claim 2, wherein the bias power comprises at least one of a write power, an erase power and a read power.

4. The optical recording and reproducing apparatus of claim 2, wherein the timing comprises a top pulse, a multi pulse and a last pulse.

5. The optical recording and reproducing apparatus of claim 2, wherein the parameter determination factor is one of a jitter, a bite error rate, a strength of the bias power, an aspect ratio (AR), a strength of a radio frequency (RF) signal output from the pickup part and a land pre-pit (LPP) detection rate.

6. The optical recording and reproducing apparatus of claim 1, wherein the control part controls to expand the variation range of the optical parameter variation part when all of the measured parameter determination factors are below the reference value.

7. A method for determining a write strategy for an optical recording and reproducing apparatus, comprising:
   varying an optical parameter within a predetermined variation range by a certain unit and outputting the varied optical parameter;
   irradiating a light corresponding to the varying optical parameter to record record data on an optical disc;
   generating reproduction data by reproducing the recorded record data;
   comparing the record data with the reproduction data to measure a parameter determination factor;
   abstracting a maximum point and a minimum point within a range where the measured parameter determination factor does not exceed a reference value; and
   determining a middle point between the maximum point and the minimum point as a final optical parameter.

8. The method of claim 7, wherein the optical parameter comprises a bias power and a timing.

9. The method of claim 8, wherein the bias power comprises at least one of a write power, an erase power and a read power.

10. The method of claim 8, wherein the timing comprises a top pulse, a multi pulse and a last pulse.

11. The method of claim 8, wherein the parameter determination factor is one of a jitter, a bite error rate, a strength of the bias power, an aspect ratio (AR), a strength of a radio frequency (RF) signal output from the pickup part and a land pre-pit (LPP) detection rate.

12. The method of claim 7, varying the optical parameter by expanding the variation range when all of the measured parameter determination factors are below the reference value.

13. An optical recording and reproducing apparatus comprising:
   an optical parameter variation part to vary an optical parameter within a predetermined variation range by a certain unit and to output the varied optical parameter;
   a pickup part irradiating a light corresponding to the varied optical parameter to record record data on an optical disc;
   a data reproduction unit to generate reproduction data by reproducing the recorded record data;
   a measuring unit comparing the record data with the reproduction data to measure a parameter determination factor; and
   a control unit to abstract a maximum point and a minimum point within a range where the measured parameter determination factor does not exceed a reference value, and to determine a middle point between the maximum point and the minimum point as a final optical parameter.

14. A method for determining a write strategy for an optical recording and reproducing apparatus, comprising:
   recording record data by irradiating a light on an optical disc;
   operating a pickup part to irradiate the light corresponding to a predetermined optical parameter;
   varying the predetermined optical parameter within a predetermined variation range by a certain unit and outputting a varied optical parameter to a driving part;
   measuring a parameter determination factor based on signals output from the pickup part; and
   determining a middle point between a maximum point and a minimum point of the predetermined optical parameter, within a range where the measured parameter determination factor does not exceed a reference value, as a final parameter.

* * * * *